United States Patent [19]
Descamps et al.

[11] 3,928,384
[45] Dec. 23, 1975

[54] BENZO[B]THIENYL ACETIC ACID ESTERS

[75] Inventors: Marcel Descamps, Crainhem; Etienne Van Durme, Wemmel, both of Belgium

[73] Assignee: Labaz, Paris, France

[22] Filed: May 7, 1973

[21] Appl. No.: 357,871

[30] Foreign Application Priority Data
June 1, 1972 United Kingdom............... 25698/72

[52] U.S. Cl................................ 260/330.5; 424/275
[51] Int. Cl.²........................................ C07D 333/60
[58] Field of Search................................ 260/330.5

[56] References Cited
UNITED STATES PATENTS

| | | | |
|---|---|---|---|
| 3,134,774 | 5/1964 | Chow et al............................ | 260/243 |
| 3,476,760 | 11/1969 | Kaiser et al...................... | 260/293.4 |
| 3,546,232 | 12/1970 | Kaiser et al........................ | 260/292 |

OTHER PUBLICATIONS

Chapman, et al., J. Chem. Soc. (c), 1969, 1612–1616.
Chapman, et al., C.A. 71: 70432g (1969).
Theilheimer, Synthetic Methods of Org. Chem., Vol. II, No. 181 (1949).
Theilheimer, Synthetic Methods of Org. Chem., Vol. III, No. 141 (1949).

Morrison et al., Org. Chem. (Allyn & Bacon, Boston, 1959), pp. 444–447.

*Primary Examiner*—Natalie Trousof
*Attorney, Agent, or Firm*—Mason, Kolehmainen, Rathburn & Wyss

[57] ABSTRACT

Benzo[b]thiophene derivatives represented by the general formula:

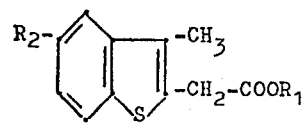

and the pharmaceutically acceptable acid addition, alkali metal and ammonium salts thereof, wherein $R_1$ represents hydrogen, a cyclohexyl group, a dialkylaminoalkyl group or an alkyl radical in which each alkyl radical is straight- or branched-chain and has one to four carbon atoms and $R_2$ represents a fluorine, chlorine or bromine atom or a methoxy group, useful as anti-arhritic agents.

3 Claims, No Drawings

BENZO[B]THIENYL ACETIC ACID ESTERS

This invention relates to heterocyclic compounds and is concerned with novel benzo[b]thiophene derivatives having pharmacological activity, pharmaceutical compositions containing them and processes for preparing the said benzo[b]thiophene derivatives.

The benzo[b]thiophene derivatives with which the invention is concerned are the compounds represented by the general formula:

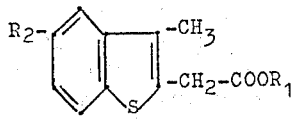   I wherein $R_1$ represents hydrogen, a cyclohexyl group, a dialkylaminoalkyl group or an alkyl radical in which each alkyl radical is straight- or branched-chain and has one to four carbom atoms, $R_2$ represents a fluorine, chlorine or bromine atom or a methoxy group.

The present invention also includes within its scope the pharmaceutically acceptable acid addition salts of those compounds of formula I in which $R_1$ represents a dialkylaminoalkyl group, as well as the pharmaceutically acceptable alkali metal salts, for example, the potassium or sodium salt, and the ammonium salt of those compounds of formula I in which $R_1$ represents hydrogen.

The compounds of formula I in which $R_1$ represents hydrogen may be prepared by the Kindler Modification of the Willgerodt Reaction (see Organic Reactions, Vol. III, 83 et seq. — published in 1949 by J. Wiley and Sons, London), in which an acetyl derivative of benzo[b]thiophene represented by the general formula:

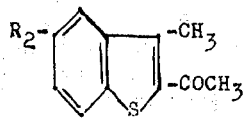   II wherein $R_2$ has the same meanings as in formula I, is heated with sulphur and a primary or secondary amine, such as for example, methylamine or morpholine, and the resulting thioamide is hydrolysed to form the required benzo[b]thionyl acetic acid which, if desired, is converted to a pharmaceutically acceptable alkali metal or ammonium salt thereof by reaction with an appropriate base.

The compounds of formula I in which $R_1$ is other than hydrogen may be prepared by reacting the appropriate benzo[b]thienyl acetic acid of formula I or the chloride of said acid, that is a compound of the general formula:

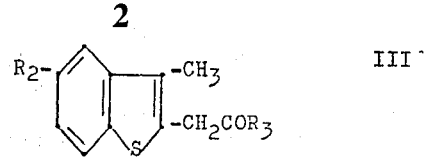   III wherein $R_2$ has the same meanings as in formula I and $R_3$ represents hydroxyl or chlorine, with an alcohol of the general formula:

$$R_4-OH$$

wherein $R_4$ represents a dialkylaminoalkyl group or an alkyl radical in which each alkyl radical is straight- or branched-chain and has one to four carbon atoms, to obtain the required compound which, when $R_4$ represents a dialkylaminoalkyl group, may, if desired, be treated with an appropriate organinc or inorganic acid to form a pharmaceutically acceptable acid addition salt thereof.

The compounds of formula II may be prepared by direct acetylation by the Friedal-Crafts reaction of a benzo[b]thiophene derivative represented by the general formula:

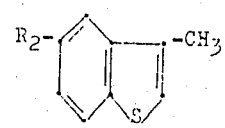   IV wherein $R_2$ has the same meanings as in formula I.

The compounds represented by formula IV are known and may be prepared by the process described in J. Chem. Soc. 518 (1968) and in British Patent Specification No. 1,177,338.

The compounds of the invention have been found to possess very useful pharmacological properties and in particular a marked anti-arthritic effect coupled with valuable anti-inflammatory and anti-pyretic activity.

It has been found, more particularly, that the compounds of the invention exert an anti-arthritic effect which becomes apparent, by enteral route, at doses of 0.25 mg/kg on arthritis experimentally induced in animals.

There are at present in existence numerous substances which are capable of producing an anti-arthritic and anti-inflammatory effect. Although many of these substances give satisfactory results, they are not devoid of undesirable side-effects. It is known, for example, that the cortico-steroids, although active against many diseases of arthritic or inflammatory origin, are not necessarily medicaments of choice or satisfactory in every case. The undesirable side-effects which accompany the use of these substances are, in fact, numerous and far from negligible since they influence certain secretory activities of the pituitary and suprarenal glands. Such secondary effects may involve the tissues causing, for example, cutaneous and muscular atrophy or decreasing the resistance of the skin to bacterial infection thus creating a greater risk of super-infection. These secondary effects may also be cardiovascular in character causing such conditions as hypertension or they may produce neuropsychic disorders such as agitation or depression. It is therefore essential to supervise closely the patient who is being treated with cortisone derivatives in order to avoid as far as possible the occurrence of such undesirable side-effects when these substances are administered in excess. It may thus be reasonably concluded that the search for a non-steroid anti-arthritic and anti-inflammatory agent is a matter of primary importance.

Amongst the non-steroid compounds having an anti-arthritic and anti-inflammatory activity, indomethacin is probably one of the most powerful and the most widely used. However, indomethacin frequently presents undesirable side-effects such as nausea, epigastric pains and possibly ulceration of the digestive tract.

Thses undesirable side-effects which are due to the powerful ulcer-producing action of indomethacin sometimes oblige the clinician to interrupt treatment with this substance or even to prohibit it in cases where there is a history of gastric ulcer.

It has now been found possible to avoid these disadvantages or at least to mitigate them by means of the compounds of the invention and in particular of the preferred compound, namely: (5-chloro-3-methyl-benzo[b]thien-2-yl)-acetic acid and its pharmaceutically acceptable salts.

Although the compounds of this invention have been found to be slightly less active than indomethacin, they possess on the other hand an ulcer-producing action which is markedly inferior to that of indomethacin as well as a lower degree of toxicity. The compound of the invention can therefore be administered in higher doses and over longer periods than indomethacin without toxic effects or an irritant action.

Considered from this point of view, the compounds of the invention represent a valuable contribution to the advancement of anti-arthritic and anti-inflammatory therapy.

The compounds of the invention have proved to be powerful anti-arthritic agents more particularly in topical administration. They have been found to be much more active than the anti-arthritic agent commonly administered by this route.

In topical administration, the anti-arthritic activity of compounds of the invention generally becomes apparent at the concentration of 0.15%.

These properties are likely to render the compounds of the invention particularly useful, and more specially in topical administration, in the treatment of arthritic or rheumatic states of various origins, for example in cases of acute articular rheumatism, chronic progressive polyarthritis, fibrositis, myositis and myalgia.

Finally, it should be noted that compounds of the invention are likely to provide valuable replacement medication. It frequently occurs, in fact, that when the same medicament is administered over a lengthy period of time the doctor prefers, for psychological or other reasons, to change the agent and use another medicament having the same therapeutic indications.

Under these circumstances, compounds of the invention may be expected, as stated above, to constitute extremely valuable replacement agents.

Pharmacological tests have been undertaken with a view to demonstrating the anti-arthritic, anti-inflammatory and anti-pyretic properties of compounds of the invention.

The anti-arthritic action of compounds of the invention was studied on the rat in chronic administration according to the technique of Freund.

Following this procedure, the size of the hind paws of the animals was measured on the first day of the trial and then 0.05 ml of a 0.5% suspension of mycobacterium butyricum was injected into the right hind paw. On the seventh day, the commencement of an arthritic reaction could be observed which was disseminated in the injected paw as well as in the other hind paw. The size of the paws was measured, the animals were divided into four homogeneous groups and then eleven consecutive daily doses of the compound to be tested were administered by intragastric route in such a way that each group received a higher dose than the preceding group. The group which constituted the control group only received 1 ml/100 g of physiological solution and in this group it was observed that the volume of the injected hind paw increased by about 200% while that of the opposite hind paw increased by about 80%.

Amongst the compounds of the invention (5-chloro-3-methylbenzo[b]thien-2-yl)-acetic acid, hereinafter referred to as the preferred compound was found to be particularly valuable as an antiarthritic agent. The results obtained in the above test with the preferred compound are listed hereunder. These results were determined on the day following the last administration of the compound to be tested.

| Dose of the Preferred Compound (in mg/kg) | Reduction of arthritis expressed in % | |
|---|---|---|
| | Injected paw | Opposite paw |
| 0.25 | 45 | 39 |
| 0.50 | 50 | 45 |
| 1.— | 76 | 65 |
| 5.— | 100 | 70 |

Other tests were performed in order to determine the $AD_{50}$ of the preferred compound as an anti-arthritic agent in comparison with the $AD_{50}$ of known anti-arthritic substances.

The $AD_{50}$ represents the amount of compound required to ensure a 50% reduction of the increase in size of the paws as compared to the control animals on the day following the last administration. The $AD_{50}$ of the preferred compound is given below in comparison with the corresponding $AD_{50}$ for indomethacin, phenylbutazone and acetylsalicylic acid:

| Substance | $AD_{50}$ (in mg/kg) | |
|---|---|---|
| | Injected paw | Opposite paw |
| Preferred compound | 0.5 | 0.75 |
| Indomethacin | 0.2 | 0.30 |
| Phenylbutazone | 2.5 | 5.— |
| Acetylsalicylic acid | 50.— | 300.— |

A similar test to that hereabove described was also undertaken on the tail of the rat.

For this purpose, 0.1 ml of a 1% suspension of mycobacterium butyricum was injected into the subcutaneous tissue of the tail of rats.

After about seven days an arthritic reaction was observed in the two back paws which increased in size reacing their maximum, i.e., an 80% to 100% increase on about the twentieth day.

On the twenty-first day the animals were divided into homogenous groups and seven consecutive daily intragastric doses of the compound to be tested were administered in such a way that each group received a higher dose than the preceding group. The control animals only received, in this test, 1 ml/100 g of physiological solution.

Trials were also carried out with indomethacin, phenylbutazone and acetylsalicylic acid in order to compare the $AD_{50}$ of each of these substances with that of the preferred compound.

The results obtained in these tests were determined on the day following the last administration of the substance under study and are given hereunder:

| Substance | $AD_{50}$ (in mg/kg) |
| --- | --- |
| Preferred compound | 2.5 |
| Indomethacin | 1.5 |
| Phenylbutazone | 50.— |
| Acetylsalicylic acid | 500.— |

These results show that indomethacin is a more powerful antiarthritic agent than the preferred compound while phenylbutazone and, more particularly, acetylsalicylic acid are considerably less active than the preferred compound.

It has, however, been found that the compounds of the invention are less toxic than indomethacin which means that the compounds of the invention can be administered in higher doses and over longer periods than indomethacin.

Additional trials were undertaken on fasting rats in order to determine the degree to which the compounds studied produced gastric ulcers in the animals so treated.

These trials showed that the mean ulcer-producing dose of indomethacin was 5 mg/kg when this compound was administered by intragastric route to rats while the corresponding ulcer-producing dose of the preferred compound was 20 mg/kg.

These results show that indomethacin is four times more irritant than the preferred compound.

Other trials were also carried out with a view to demonstrating the anti-arthritic action of compounds of the invention in topical application.

For this purpose the technique of Freund, hereabove described, was used in one hind paw and also in the tail of rats. When the mycobacterium butyricum was injected into the paw, the ointment containing the compound to be studied was applied on the paw so treated once a day for eleven consecutive days. When the mycobacterium was injected into the tail eight daily applications of the same ointment were made.

The results obtained with the preferred compound as compared with phenylbutazone are listed hereunder:

1. Mycobacterium butyricum injected into the paw

| Concentration of preferred Compound in the ointment expressed in % | Reduction of arthritis in % | |
| --- | --- | --- |
| | Injected paw | Opposite paw |
| 0.1 | 54 | 15 |
| 0.25 | 61 | 56 |
| 0.5 | 81 | 65 |
| 1.— | 100 | 77 |

The $AD_{50}$ of the preferred compound in this test is thus 0.1% in the injected hind paw and 0.2% in the opposite hind paw.

In comparative trials carried out under the same conditions, phenylbutazone showed an $AD_{50}$ of 1% in the injected hind paw and 2% in the opposite hind paw.

2. Mycobacterium butyricum injected into the tail

| Concentration of preferred compound in the ointment expressed in % | Reduction of arthritis in % |
| --- | --- |
| 0.25 | 41 |
| 0.5 | 55 |
| 1.— | 46 |
| 2.5 | 49 |

The $AD_{50}$ of the preferred compound, in this test, is 0.5% while that of phenylbutazone was found to be 5%.

From these results it may be concluded that the preferred compound is ten times more active than phenylbutazone in topical administration in the form of an ointment.

Tests carried out under the same conditions with bufexamac have shown that this compound is practically inactive at the concentration of 5%.

The anti-inflammatory action of compounds of the invention was demonstrated in comparative trials involving inhibition of local carragheenin-induced oedema in the paws of fasting rats by the method described by Janssen in J. Pharm. Pharmacol. 1964, 16, 810–816.

The carragheenin was injected into the plantar aponeurosis of the back paws of a group of female rats one hour after the compound to be tested had been administered by oral route. The size of the paws so treated was measured by plethysmograph both before and three hours after administration of the carragheenin. The anti-inflammatory activity was calculated as the percentage of reduction of the resulting oedema as compared with control animals which had received the same does of carragheenin without any anti-inflammatory agent.

The $AD_{50}$ was taken as the amount of compound required to ensure a 50% reduction of the oedema.

The following compounds were found to be particularly useful as anti-inflammatory agents:
(5-chloro-3-methyl-benzo[b]thien-2-yl)-acetic acid (Preferred Compound)
(5-bromo-3-methyl-benzo[b]thien-2-yl)-acetic acid (Compound A)
methyl(5-chloro-3-methyl-benzo[b]thien-2-yl)-acetate (Compound B)
(5-methoxy-3-methyl-benzo[b]thien-2-yl)-acetic acid (Compound C)
ethyl(5-chloro-3-methyl-benzo[b]thien-2-yl)-acetate (Compound D)
dimethylaminoethyl(5-chloro-3-methyl-benzo[b]thien-2-yl)-acetate hydrochloride (Compound E)
dimethylamino-n-propyl-(5-chloro-3-methyl-benzo[b]thien-2-yl)-acetate hydrochloride (Compound F)

(5-fluoro-3-methyl-benzo[b]thien-2-yl)-acetic acid (Compound G)

The $AD_{50}$ registered for these compounds as well as for the substances employed for comparison purposes were as follows:

| Compound | $AD_{50}$ (in mg/kg) |
| --- | --- |
| Preferred Compound | 23 |
| A | 22 |
| B | 24 |
| C | 25 |
| D | 27 |
| E | 50 |
| F | 50 |
| G | 80 |
| Indomethacin | 4 |
| Acetylsalicylic acid | 110 |

These figures show that indomethacin is a more powerful anti-inflammatory agent than the compounds of the invention.

However, as the compounds of the invention are less toxic than indomethacin, they have a greater safety margin which enables them to be administered in higher doses and for longer periods.

Finally, the anti-pyretic activity of compounds of the invention was demonstrated on the rat by the technique of Winter and Nuss described in Toxicology and Applied Pharmacology, 1963, 5, 247–256.

This procedure consists in provoking hyperthermia by the intraperitoneal administration of 0.5 mg/kg of lipopolysaccharide prepared from Escherichia Coli. Three hours after injection, a dose of the compound to be studied was administered by intragastric route and the reduction of hyperthermia was measured four hours after administration of the compound to be tested.

In a trial carried out with the preferred compound, it was found that a dose of 20 mg/kg of this compound provokes a 50% reduction of hyperthermia as compared with the control animals while 50 mg/kg of phenylbutazone or acetylsalicylic acid were necessary to obtain the same result.

Finally, toxicity tests were undertaken with compounds of the invention. Trials performed with rats revealed the following $LD_{50}$'S by intragastric route after a seven-day period of observation:

| Compound | $LD_{50}$ (in mg/kg) |
| --- | --- |
| Preferred Compound | 120 |
| A | 120 |
| B | 170 |
| G | 500 |

The $LD_{50}$ of the Preferred Compound administered in rats by intraperitoneal route was found to be 180 mg/kg after a seven-day period of observation.

In mice the $LD_{50}$'S of the preferred compound are 85 mg/kg and 300 mg/kg by intraperitoneal and intragastric route respectively after a 7-day period of observation.

These figures compare favourably with those obtained with indomethacin where the $LD_{50}$ for rats by intragastric route was found to be 22.5 mg/kg. In mice, the $LD_{50}$ of this same substance by intragastric route was found to be 80 mg/kg and by intraperitoneal route 50 mg/kg.

It will be appreciated that for therapeutic use, the compounds of the invention will normally be administered in the form of a pharmaceutical composition comprising as an essential active ingredient at least one compound of the invention in association with a pharmaceutical carrier therefor. The carrier may be a solid diluent or excipient of the kind normally employed in the production of medicaments ready for use, such diluent or excipient being for example, one or more of the following substances: milk sugar, corn starch, polivinylpyrrolidone, sodium carboxymethylstarch, talc, colloidal silica, magnesium stearate, gelot 64 (a mixture of stearic esters of glycerol and polyoxyethyleneglycol), cetylic alcohol, spermaceti, isopropyl palmitate, triethanolamine, polyethyleneglycol 400, methyl or propyl p-oxybenzoate, distilled water.

The composition may be made up in a form suitable for the desired mode of administration which may be by the oral, rectal, topical or parenteral route.

Advantageously for clinical use, the composition is made up in a dosage unit form adapted for the desired mode of administration. The dosage unit may be, for example, a tablet, pill, packaged powder, capsule, syrup for oral administration, a cream, an ointment for topical administration, a solution or suspension for injection or a suppository for rectal administration. The amount of active ingredient in each dosage unit will be such that one or more units are required for each therapeutic administration.

The following Examples illustrate the invention:

EXAMPLE 1

(5-Chloro-3-methyl-benzo[b]thien-2-yl)-acetic acid a. 2-Acetyl-5-chloro-3-methyl-benzo[b]thiophene 660 g (3.62 mol) of 5-chloro-3-methyl-benzo[b]thiophene and 285 g (3.62 mol) of acetyl chloride were placed into 4.5 litres of dry benzene. The mixture was cooled to 0°C and maintained at this temperature while a solution of 943 g (3.62 mol) of tin tetrachloride in 1.5 litres of dry benzene was added drop-by-drop. At the end of the operation, the solution was stirred for 1 hour at 0°C and then for a further 24 hours at room-temperature. While cooling, the complex which formed was decomposed with a 5% solution of hydrochloric acid. The organic phase was washed with water, then with a solution of sodium bicarbonate and again with water. After drying over anhydrous sodium sulphate, the benzene was eliminated after which the resulting residue quickly crystallized.

After recrystallization from absolute ethanol, 637.7 g of pure 2-acetyl-5-chloro-3-methyl-benzo[b]thiophene were obtained, melting at 113°–115°C, representing a yield of 78% of the theoretical yield.

b. (5-Chloro-3-methyl-benzo[b]thien-2-yl)-acetic acid

A mixture of 637.7 g (2.83 mol) of 2-acetyl-5-chloro-3-methyl-benzo[b]thiophene, 136 g (4.25 mol) of sulphur and 370 g (4.25 mol) of morpholine was refluxed for 7 hours. After cooling, 6 litres of a 5% solution of hydrochloric acid were added. The reaction medium was vigorously stirred until the solid mass at the bottom of the flask was dispersed. The (5-chloro-3-methyl-benzo[b]-thien-2-yl)-acetyl-thiomorpholide was then filtered out, washed, dried and recrystallized from benzene. In this way, 692.2 g were obtained, melting at 174°C, representing a yield of 74%.

The 692.2 g (2.12 mol) of thiomorpholide thus obtained were allowed to simmer gently for 6 hours with a solution of 350 g (8.75 mol) of sodium hydroxide in 3,150 ml of ethanol and 350 ml of water. Most of the ethanol was evaporated off and the quantity of water required to ensure complete dissolution of the sodium salt of the acid was added. The resulting solution was acidified with a diluted solution of hydrochloric acid to cause (5-chloro-3-methyl-benzo[b]thien-2-yl)-acetic acid to precipitate. The product so obtained was filtered, washed, dried and recrystallized from a mixture of benzene and ethanol. In this manner, 359.4 g of the acid were obtained, melting at 178°C, representing a yield of 70%.

EXAMPLE 2

Ethyl(5-chloro-3-methyl-benzo[b]thien-2-yl)-acetate

A mixture of 25 g (0.10 mol) of (5-chloro-3-methyl-benzo[b]thien-2-yl)-acetic acid (prepared in the manner described in Example 1), 500 ml of absolute ethanol and 2 ml of sulphuric acid was refluxed for 20 hours. Most of the ethanol was evaporated off and the solution allowed to cool. Iced water was poured in and the solution extracted with ether, washed twice with a solution of sodium bicarbonate and finally with water. The ethereal layer was dried over anhydrous sodium sulphate and the ether evaporated off. The oily residue obtained was distilled to give 18.5 g of the desired product, boiling at 132°–136°C under 0.01 mm.Hg, representing a yield of 66%. The product subsequently solidified and had a melting point of 47°–49°C.

EXAMPLE 3

Ethyl(5-chloro-3-methyl-benzo[b]thien-2-yl)-acetate

A mixture containing 25 g (0.10 mol) of (5-chloro-3-methyl-benzo[b]thien-2-yl)-acetic acid, 100 ml of thionyl chloride and 200 ml of hexane was refluxed for 2 hours. The hexane was then evaporated off together with the excess of thionyl chloride. The resulting crude acid chloride was placed in 300 ml of absolute ethanol. This solution was stirred for 24 hours at room-temperature, after which it was poured into iced water and extracted with ether. The organic layer was washed with water and dried over anhydrous sodium sulphate and the ether was evaporated off. The oily residue obtained was distilled to give 26.8 g of the desired product, boiling at 133°–140°C under 0.01 mm.Hg, representing a yield of 96%. The product subsequently solidified and had a melting point of 47°–49°C.

By the methods described in the foregoing Examples and using the appropriate starting materials, the following compounds of formula I were prepared:

EXAMPLE 4

Dimethylaminoethyl (5-chloro-3-methyl-benzo[b]thien-2-yl)-acetate and its hydrochloride A mixture containing 10 g (0.041 mol) of (5-chloro-3-methyl-benzo[b]thien-2-yl)-acetic acid, 40 ml of thionyl chloride and 80 ml of hexane was refluxed for 2 hours after which the hexane and excess of thionyl chloride were evaporated off. The crude acid chloride thus obtained was dissolved in 50 ml of chloroform and 25 ml of anhydrous ether. The resulting solution was added, drop-by-drop, to a solution of 3.7 g (0.041 mol) of 2-dimethylamino-ethanol in 50 ml of chloroform and 25 ml of anhydrous ether while the temperature was maintained at 25°C. At the end of this operation, the resulting solution was stirred for 12 hours at 25°C, extracted with 100 ml of a 5% solution of hydrochloric acid, alkalinized and the ester extracted with ether. The resulting solution was dried over anhydrous sodium sulphate and the ether evaporated of. The oily residue was distilled to give 5.4 g of the desired compound, boiling at 160°–165°C under 0.01 mm.Hg, representing a yield of 37%.

The compound obtained was then dissolved in anhydrous ether and a solution of hydrochloric acid in ether was added. The resulting precipitate was filtered off and recrystallized from a mixture of absolute ethanol and anhydrous ether to give 4.2 g of the corresponding hydrochloride, melting at 166°C.

By using the method described in the foregoing Example with the appropriate starting materials, the following compound was prepared:

Dimethylamino-n-propyl (5-chloro-3-methyl-benzo[b]-thien-2-yl)-acetate hydrochloride  m.p. 141°C

EXAMPLE 5

Tablets were prepared by granulating and compressing the following substances in accordance with known pharmaceutical techniques:

| Ingredient | mg |
| --- | --- |
| (5-Chloro-3-methyl-benzo[b]thien-2-yl)-acetic acid | 50 |
| Milk sugar | 120 |
| Corn starch | 56 |
| Polyvinylpyrrolidone | 5 |
| Sodium carboxymethylstarch | 8 |
| Talc | 7 |
| Colloidal silica | 2 |
| Magnesium stearate | |
| | 250 |

EXAMPLE 6

A cream corresponding to the following formula was prepared in accordance with known pharmaceutical techniques:

| | |
| --- | --- |
| Methyl(5-chloro-3-methyl-benzo[b]thien-2-yl)-acetate | m.p. 77°C |
| (5-Bromo-3-methyl-benzo[b]thien-2-yl)-acetic acid | m.p. 185–187°C (from benzene) |
| (5-Fluoro-3-methyl-benzo[b]thien-2-yl)-acetic acid | m.p. 166–167°C (from benzene) |
| (5-Methoxy-3-methyl-benzo[b]thien-2-yl)-acetic acid | m.p. 125–127°C (from benzene/hexane) |

| Ingredient | g |
|---|---|
| (5-Chloro-3-methyl-benzo[b]thien-2-yl)-acetic acid | 1 |
| Gelot 64 | 15 |
| Cetylic alcohol | 2 |
| Spermaceti | 2 |
| Isopropyl palmitate | 5 |
| Triethanolamine | 0.75 |
| Hydrochloric acid N | q.s. for pH = 6 |
| Polyethyleneglycol 400 | 5 |
| Methyl p-oxybenzoate | 0.13 |
| Propyl p-oxybenzoate | 0.02 |
| Distilled water | q.s. for 100 g |

We claim:
1. A benzo thiophene compound of the formula:

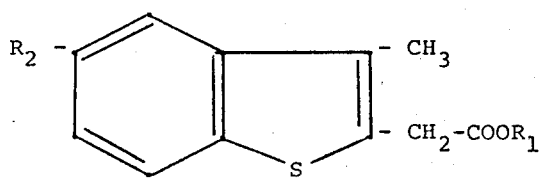

or a pharmaceutically acceptable acid addition salt thereof, wherein $R_1$ represents dialkylaminoalkyl in which each alkyl radical is straight- or branched-chain and has one to four carbon atoms, and $R_2$ represents fluorine, chlorine or bromine.

2. A benzo thiophene compound as defined by claim 1 wherein $R_1$ is beta-dimethylaminoethyl and $R_2$ is chlorine.

3. A benzo thiophene compound as defined by claim 1 wherein $R_1$ is gamma-dimethylaminopropyl and $R_2$ is chlorine.

* * * * *